(12) United States Patent
Seifert et al.

(10) Patent No.: US 6,751,530 B2
(45) Date of Patent: Jun. 15, 2004

(54) AERIAL VEHICLE CONTROLLED AND PROPELLED BY OSCILLATORY MOMENTUM GENERATORS AND METHOD OF FLYING A VEHICLE

(75) Inventors: Avraham Seifert, Tel-Aviv (IL); David Greenblatt, Ra'Anana (IL); Israel Wygnanski, Tel-Aviv (IL)

(73) Assignee: Ramot At Tel Aviv University Ltd., Tel Aviv (IL)

( * ) Notice: Subject to any disclaimer, the term of this patent is extended or adjusted under 35 U.S.C. 154(b) by 0 days.

(21) Appl. No.: 10/164,416

(22) Filed: Jun. 10, 2002

(65) Prior Publication Data

US 2003/0229428 A1 Dec. 11, 2003

(51) Int. Cl.⁷ .............................................. B64C 13/00
(52) U.S. Cl. ........................... 701/4; 244/175; 244/203; 244/204
(58) Field of Search .............................. 701/4; 244/203, 244/204, 207, 208, 213, 214, 215, 216, 199, 175

(56) References Cited

U.S. PATENT DOCUMENTS

| | | | |
|---|---|---|---|
| 4,257,224 A | 3/1981 | Wygnanski et al. | 60/204 |
| 5,209,438 A | 5/1993 | Wygnanski | 244/203 |
| 5,277,380 A | 1/1994 | Cycon et al. | 244/12.2 |
| 5,419,513 A | 5/1995 | Flemming, Jr. et al. | 244/12.2 |
| 5,575,438 A | 11/1996 | McGonigle et al. | 244/13 |
| 5,672,086 A * | 9/1997 | Dixon | 446/37 |
| 6,250,586 B1 | 6/2001 | Seifert et al. | 244/52 |
| 6,405,980 B1 * | 6/2002 | Carter, Jr. | 244/230 |
| 6,543,719 B1 * | 4/2003 | Hassan et al. | 244/17.13 |

FOREIGN PATENT DOCUMENTS

IL    116668    1/1996

OTHER PUBLICATIONS

Goldschmied, F. R., "Fuselage Self–Propulsion by Static–Pressure Thrust: Wind Tunnel Verification", AIAA Paper 87–2935, 1987.

Liebeck, R. "Design of the blended–wing–body subsonic transport," AIAA Paper 2002–0002, 40th AIAA Aerospace Sciences Meeting & Exhibit, Reno, NV, 2002.

McMichael, J M. and Francis, M. S. "Micro Air Vehicles—Toward a New Dimension in Flight", http://www.darpa.mil/tto/programs/mav.html.

Closed–loop Control of a Ball Position on a Beam using Piezo–Electric Fluidic Jets by M. Nokhimovitch, R. Benima, and H. Aharonov.

Spedding. and Maxworthy (1986) J. Fluid Mech., vol. 165, pp. 247–272.

Anderson, J. D. Jr., "Introduction to Flight", McGraw–Hill, New York, 3ed, 1989.

Seifert, A. and Pack, L. G, 2000, "Separation Control at Flight Reynolds numbers: Lessons learned and Future direction", AIAA paper 2000–2542, AIAA Fluid 2000 meeting, Denver, CO, Jun. 19–22, 2000.

Greenblatt, D. and Wygnanski, I., "Use of Periodic Excitation to Enhance Airfoil Performance at Low Reynolds Numbers" AIAA Journal of Aircraft, vol. 38, No. 2, 2001, pp. 190–192.

Greenblatt and Wygnanski (1991) AIAA Papers 99–3121 and 99–3504, 17th AIAA Applied Aerodynamics Conference, Norfolk, VA, Jun. 28–Jul. 1).

* cited by examiner

Primary Examiner—Marthe Y. Marc-Coleman
(74) Attorney, Agent, or Firm—Mark M. Friedman

(57) ABSTRACT

A vehicle capable of flight including at least one wing including at least one oscillatory momentum generator mounted therein. A thrust force from the oscillatory momentum generator is directed outwards over the wing causing a lift-generating air flow over a wing surface. A method of flying a vehicle including providing at least one wing having at least one oscillatory momentum generator mounted therein and applying a thrust force from the generator which is directed outwards over the wing and directed to the trailing edge so that a lift generating air flow is created.

24 Claims, 11 Drawing Sheets

Figure 4a    20
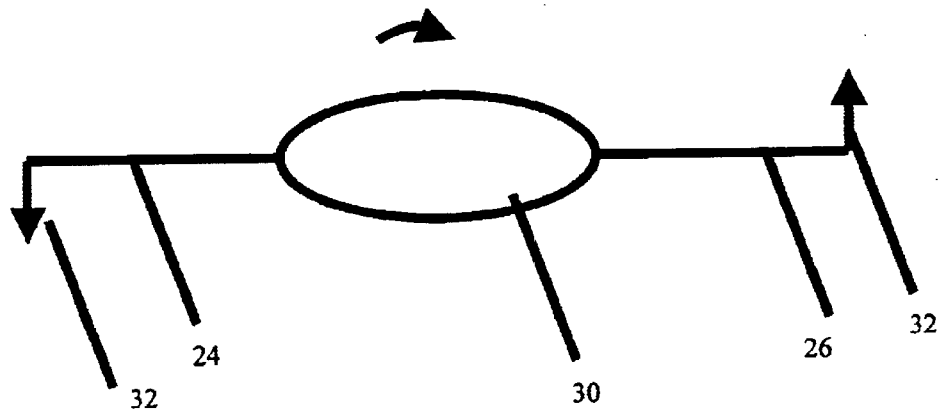
Figure 4b    20
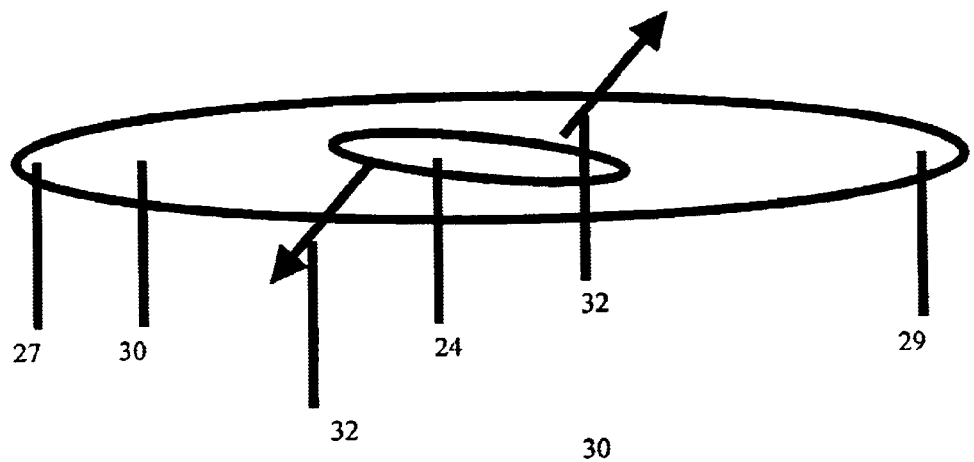
Figure 4c    20
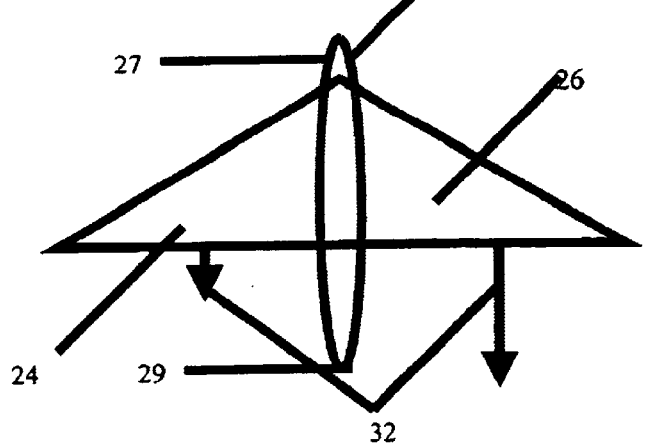

ated with increasingly bluff bodies that inevitably accompany higher storage volumes. A classic example of this tradeoff is embodied by the C-130J that employs a ramp at the rear of a wide fuselage that introduces a moderate drag penalty.

AERIAL VEHICLE CONTROLLED AND PROPELLED BY OSCILLATORY MOMENTUM GENERATORS AND METHOD OF FLYING A VEHICLE

FIELD AND BACKGROUND OF THE INVENTION

The present invention relates to an aerial vehicle controlled and propelled by oscillatory momentum generators and method of flying a vehicle and, more particularly, to the use of oscillatory momentum generators to sustain flight of a miniature or micro-miniature vehicle. The claimed invention is useful primarily in unmanned aerial vehicles (UAVs).

The aeronautical engineer has historically been faced with a tradeoff between physical storage space on an aircraft and the drag penalties associated with increasingly bluff bodies that inevitably accompany higher storage volumes. A classic example of this tradeoff is embodied by the C-130J that employs a ramp at the rear of a wide fuselage that introduces a moderate drag penalty.

In an attempt to resolve this disparity, Goldshmied (Goldschmied, F. R., "Fuselage Self-Propulsion by Static-Pressure Thrust: Wind Tunnel Verification", AIAA Paper 87-2935, 1987.), studied the ideal shape of a thick body of revolution that employed suction as a means of Active Flow Control (AFC) that yielded low drag and high thrust efficiency and even demonstrated pressure thrust. Goldshmied further combined AFC with propulsion. Such a profile or body of revolution can serve the dual purpose of accommodating flow control actuators and utilizing them effectively for thrust, lift and moment control. Attitude Control can be gained and enhanced through distributed actuation or spatially differentiating the control authority to gain all three moments required for guidance.

Flying vehicles based upon the teachings of Goldshmied and Smith are known in the art. A further step in increasing the efficacy of flying vehicles could be achieved by combining the lifting, storing and controlling functions to a single structure, e.g. the flying wing.

For example, the propeller driven YB-35 flying-wing bomber conceptually designed by Sears (*NORTHROP—an Aerodynamic History* by F. Anderson—Northrop Press 1976) in the mid 1940's had a range of 7500 miles and service ceiling of 40,000 ft. The Y-49 jet powered version was capable of cruising at 392 mph and reached 42,600 ft. Further examples include the B-2 flying wing bomber and so-called blended wing transport, (Liebeck, R. "Design of the blended-wing-body subsonic transport," AIAA Paper 2002-0002, 40$^{th}$ AIAA Aerospace Sciences Meeting & Exhibit, Reno, Nev., 2002). Thus the structural robustness, large inherent storage capability, low drag, potential for good aerodynamics with AFC offered by the Goldshmied profile incorporated into a flying-wing configuration have long been appreciated. Further, additional control authority obtained by relaxing the AFC on certain preselected areas of the configuration has the potential to allow the flow to separate from segments of the aft upper surface, allowing "push-pull" control approaches. However, application of these principles to miniaturized aircraft has not previously been achieved because conventional flight cannot be achieved at these small scales and low velocities.

An unmanned aerial vehicle (UAV) is preferred over a conventional aircraft with a pilot whenever there is significant danger of loss of the aircraft (e.g. in warfare, extreme weather conditions, detection of hazardous materials or fire control operations). Typically, UAV's have resembled small airplanes equipped with remote control or automated navigational systems. The navigational system may be, for example, via remote radio control or by a pre-programmed on-board computer and sensors suite. Such a UAV is costly, large and significantly looses efficiency when reduced in size, i.e. such that its wings operate at Reynolds numbers of 100,000 or smaller. Because the UAV does not need to carry a pilot, the payload is reduced and miniaturization becomes feasible. Recent advances in miniaturization of electronic, optic and sensing equipment serve to further reduce the required payload for a UAV. In theory, this should facilitate further miniaturization, and has indeed been attempted (e.g. McMichael, J M. and Francis, M. S. "Micro Air Vehicles—Toward a New Dimension in Flight", http://www.darpa.mil/tto/programs/mav.html).

However, this further miniaturization has not previously been successfully achieved because of the need to fly at large speeds to overcome the low efficiency imposed by the low Reynolds numbers. Additionally, these devices are extremely fragile due to their combined structural complexity and imposed weight limitations.

Typically, prior art UAV's are propelled by rotors (e.g. U.S. Pat. Nos. 5,419,513; 5,277,380; and 5,575,438). This limits the degree of miniaturization, which can be implemented owing to torque forces about the axis of the rotor and it forces large empennage (which is even less efficient than the main wing due to the smaller size). In addition, the rotors themselves increase the fragility of the UAV, limiting the range of applications to which they are suited.

Thus, there is a great un-met need for an aerial vehicle controlled and propelled by oscillatory momentum generators and a method of flying a vehicle devoid of the above limitations.

SUMMARY OF THE INVENTION

According to one aspect of the present invention there is provided a vehicle capable of flight. The vehicle includes: (a) at least one wing; and (b) at least one oscillatory momentum generator mounted within the at least one wing. A thrust force from the oscillatory momentum generator directed outwards over the wing causes the wing to move so that a lift-generating air flow over a surface of the at least one wing is created.

According to another aspect of the present invention there is provided a method of flying a vehicle. The method includes: (a) providing on the vehicle at least one wing having at least one oscillatory momentum generator mounted therein; and (b) applying a thrust force from the at least one oscillatory momentum generator. The thrust force is directed outwards over the wing causing the wing to move so that a lift generating air flow over a surface of the at least one wing is created.

According to further features in preferred embodiments of the invention described below, the oscillatory momentum generator includes: (i) an internal cavity including an oscillatory jet ejection port, the jet ejection port being in communication with an environment exterior to the cavity; (ii) at least one oscillatable diaphragm designed and constructed to alternately decrease and increase a volume of the internal cavity; and (iii) an alternating electric current applicable to the at least one oscillatable diaphragm, the alternating electric current causing the diaphragm to oscillate, thereby expelling air through the jet emanation port and creating the thrust force.

According to still further features in the described preferred embodiments the oscillatory momentum generator further includes at least one electro-mechanical element designed and constructed to cause the diaphragm to vibrate at a frequency proportional to a frequency of the alternating electric current.

According to still further features in the described preferred embodiments the vehicle further includes an electric power source capable of supplying the alternating electric current.

According to still further features in the described preferred embodiments the thrust force is at least approximately 1 gram per watt of a power emanating from the power source.

According to still further features in the described preferred embodiments the oscillatory momentum generator operates at a resonance frequency thereof.

According to still further features in the described preferred embodiments the vehicle further includes an oscillation frequency sensor designed and constructed to sense oscillation of the diaphragm. Output from this sensor may be employed to cause the device to operate at its resonance frequency According to still further features in the described preferred embodiments the vehicle further includes an attitude control system which operates by differentially regulating a thrust force applied by at least two of the at least one oscillatory momentum generators.

According to still further features in the described preferred embodiments the attitude control system regulates at least one parameter selected from the group consisting of roll, pitch and yaw.

According to still further features in the described preferred embodiments the vehicle further includes a launch assist device capable of imparting an initial velocity ($v_i$) of approximately at least 10 m/s to the vehicle.

According to still further features in the described preferred embodiments the vehicle has a wingspan less than or equal to 45 cm.

According to still further features in the described preferred embodiments the at least one oscillatory momentum generator includes a plurality of oscillatory momentum generators arranged in at least one row along the at least one wing.

According to still further features in the described preferred embodiments the thrust force exits the oscillatory momentum generator at an angle of less than approximately 45 degrees with respect to the surface of the wing. Preferably, the thrust force is directed to a trailing edge of the wing.

According to still further features in the described preferred embodiments the applying the thrust force includes: (i) providing the oscillatory momentum generator, (ii) oscillating the at least one oscillatable diaphragm to alternately decrease and increase a volume of the internal cavity; and (iii) applying the alternating electric current to the at least one oscillatable diaphragm to cause the diaphragm to oscillate, thereby expelling an air stream through the jet emanation port and creating the thrust force. The generator includes an internal cavity, an oscillatory jet ejection port in fluid communication with an environment exterior to the cavity and with the cavity, at least one oscillatable diaphragm, and an alternating electric current;

According to still further features in the described preferred embodiments the applying the thrust force further includes: (iv) employing at least one electro-mechanical element designed and constructed to cause the diaphragm to vibrate at a frequency proportional to a frequency of the alternating electric current.

According to still further features in the described preferred embodiments the method includes providing an electric power source capable of supplying the alternating electric current.

According to still further features in the described preferred embodiments a thrust force of at least approximately 1 gram per watt of electric power emanating from the power source is achieved.

According to still further features in the described preferred embodiments the method further includes causing the oscillatory momentum generator to operate at a resonance frequency thereof.

According to still further features in the described preferred embodiments the method further includes employing an oscillation frequency sensor to sense oscillation of the diaphragm. An output of the oscillation frequency sensor is then employed to cause the oscillatory momentum generator to operate at a resonance frequency thereof.

According to still further features in the described preferred embodiments the method further includes controlling an attitude of the vehicle by differentially regulating a thrust force applied by at least two of a plurality of the at least one oscillatory momentum generators.

According to still further features in the described preferred embodiments the method further includes applying a launch force capable of imparting an initial velocity ($v_i$) of approximately at least 10 m/s to the vehicle.

According to still further features in the described preferred embodiments the method further includes limiting a wingspan of the at least one wing to less than approximately exactly 45 cm.

According to still further features in the described preferred embodiments the method further includes deploying a plurality of the at least one oscillatory momentum generators in at least one row along the at least one wing.

According to still further features in the described preferred embodiments the method further includes directing the thrust force to exit the oscillatory momentum generator at an angle of less than approximately 45 degrees with respect to the surface of the wing.

The present invention successfully addresses the shortcomings of the presently known configurations by providing an aerial vehicle controlled and propelled by oscillatory momentum generators and method of flying same.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIGS. 4a–c depict control of roll, pitch and yaw respectively via differential control of oscillatory momentum generators within a wing of an aerial vehicle according to the present invention;

DESCRIPTION OF THE PREFERRED EMBODIMENTS

Figure 1:
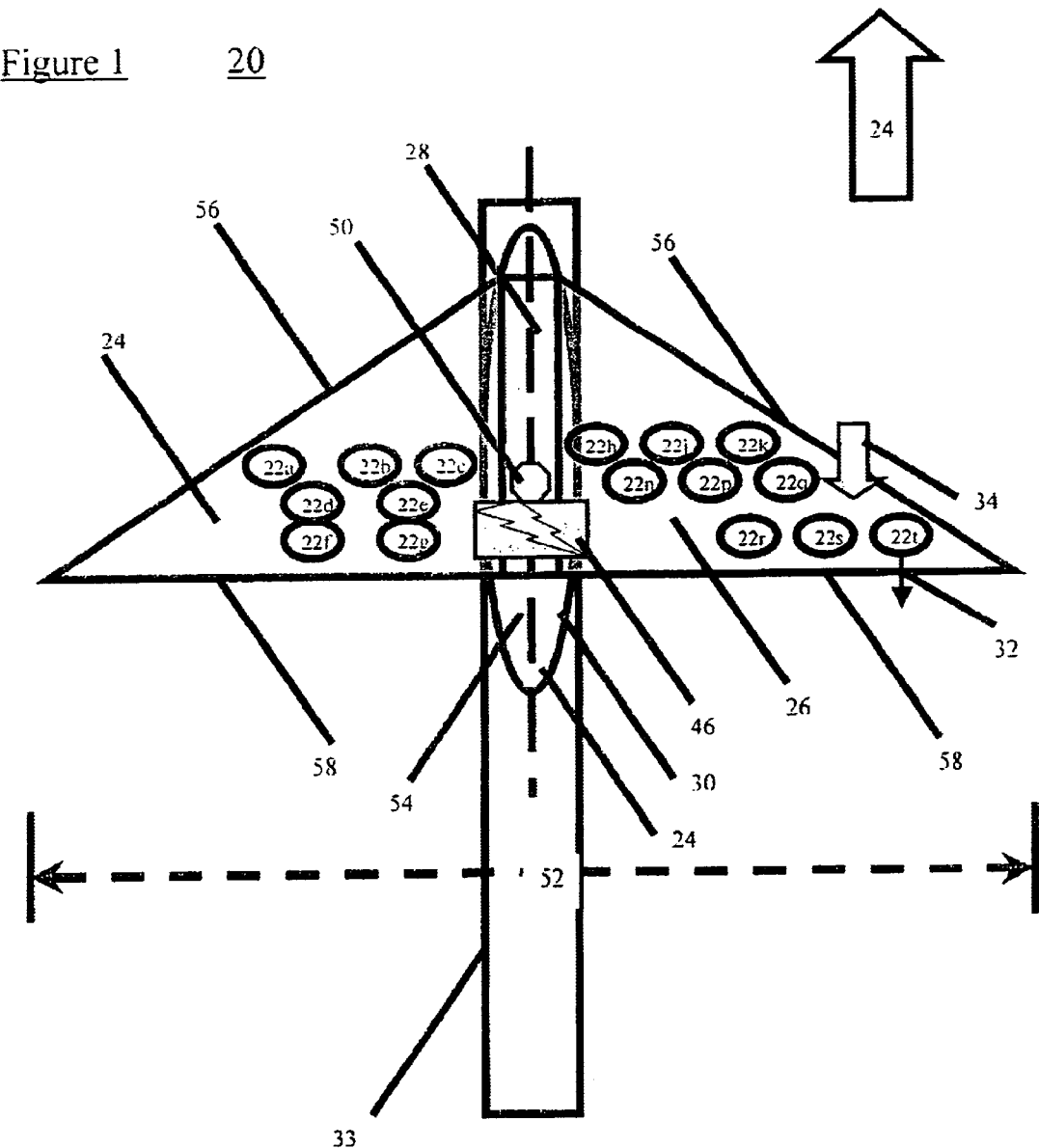
FIG. 1 is a top view of an aerial vehicle according to the present invention.

The present invention is of an aerial vehicle and method of flying same which can be controlled and propelled by oscillatory momentum generators.

Specifically, the present invention can be used to sustain flight of a miniature or micro-miniature vehicle especially an unmanned aerial vehicle (UAV). Vehicles according to the present invention are expected to find utility in, for example, observation, reporting and delivery tasks. For example, owing to the improved aerodynamic performance of the disclosed vehicles, a 45 cm vehicle, weighing 2–4 Newtons, can carry sufficient "off the shelf" surveillance equipment to perform a multitude of military, environmental and other monitoring missions. It will be appreciated that, due to the general trend towards miniaturization of electronic equipment, a pay load of 500 to 1000 grams will permit accomplishment of a wide variety of tasks by a vehicle according to the present invention.

Some embodiments of the disclosed vehicle are uniquely practical because the means for thrust, control and lift augmentation are located internally, within the wing of the vehicle. Thus, traditional control surfaces, as well as external propulsion devices such as motor-driven propellers, may be entirely eliminated. According to these preferred embodiments, the only physically detectable evidence of AFC is the streaming flow of zero-mass flux jets issuing from slots on the surface of the vehicle. Further, the disclosed vehicle does not necessarily depend upon ornithopter-type flapping-wing concepts for the simultaneous generation of lift and thrust. Consequently, linkages, push rods, propellers, hinges and moving wings which are all susceptible to damage may be eliminated. Externally the vehicle has an aerodynamic shape with no visibly apparent propulsion and control devices. This design imparts a previously unachieved robustness and battle-worthiness within the context of a miniature UAV with dimensions limited to 45 cm. Alternately, the disclosed vehicle may be in the form of a rotary wig vehicle (i.e. helicopter).

Development of Micro Air Vehicles ($\mu$AVs) with dimensions limited to 15 cm, was recently initiated by the Defense Advanced Research Projects Agency (DARPA) (see McMichael, J M. and Francis, M. S. "Micro Air Vehicles—Toward a New Dimension in Flight", http://www.darpa.mil/tto/programs/mav.html). This initiative is the result of emergence of previously unknown technological feasibility and emergence of new military and environmental needs, especially in urban environments." (McMichael & Francis, 1997). For example, $\mu$AVs may give the individual soldier previously unavailable on-demand information about his surroundings thereby providing unprecedented situational awareness, greater effectiveness and reduced casualty rates. It is further anticipated that technological spin-offs produce other applications such as detection of toxic or radioactive waste or assistance in law enforcement.

It will be appreciated that advances in several microtechnologies, particularly micro-electromechanical systems (MEMS), which combine micro electronics with micro mechanical elements of varying complexity to achieve functionality hitherto considered unattainable (e.g. integrated systems of propulsors, sensors, actuators and processors) serve to enable the disclosed vehicles. Thus, one of ordinary skill in the art will be able to incorporate a variety of commercially available components into a vehicle according to the present invention according to guidelines set forth hereinbelow. Further, other maturing micro systems such as tiny CCD-array cameras, infrared sensors and hazardous substance detectors, increase the range of tasks potentially performable by a vehicle according to the present invention.

Notwithstanding these developments in miniaturization, the inventors overcame formidable technical challenges in reducing the disclosed vehicle and method to practice. Specifically, the aerodynamics, flight control, propulsion and power of the disclosed vehicle all offer substantial non-obvious improvements which transcend issues of miniaturization, although they rely upon availability of miniature components.

Periodic excitation as means for manipulating a turbulent flow (initially the mixing layer between two streams) is known in the art (e.g. U.S. Pat. No. 4,257,224). Subsequent development included the active control of separation with the consequent enhancement of lift (e.g. U.S. Pat. No. 5,209,438) and the motion control of a solid body or a fluid stream (Israel Patent 116668, and U.S. patent application Ser. No. 09/091,753). The present invention facilitates application of these principles, by previously unknown configurations, to low Reynolds number applications (Re<$10^5$). Specifically, additional applications of AFC, including propulsion and flight control become viable. This represents use of zero mass flux oscillatory momentum generators to sustain and control flight of a vehicle for the first time.

Further included in the present invention is miniature UAVs, as opposed to the above-mentioned $\mu$AV, with dimensions up to 45 cm and a weight increased by a factor of 2 to 4. These vehicles are capable sustaining flight speeds as low as about 10 m/s. Data is presented to illustrate how active flow control in the form of periodic excitation can be used to fly efficiently at Re<$10^5$, by eliminating flow separation from the airfoil surface. Further presented is data illustrating piezo-based actuators that produce high-amplitude excitation with the capability of providing sufficient thrust for sustained flight. With separation controlled and thrust generated, further data is presented to illustrate the potential for flight control by means of periodic excitation, thus eliminating the need for conventional control surfaces.

The principles and operation of an aerial vehicle controlled and propelled by oscillatory momentum generators according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Referring now to the drawings, FIG. 1 illustrates a vehicle 20 capable of flight according to the present invention. Vehicle 20 includes at least one wing (24, 26 and 28). According to some embodiments of the invention, Wing (24, 26 and 28) operates as a "flying wing" with no distinct fuselage. According to alternate embodiments of the invention, vehicle 20 further includes a fuselage 30, for example fuselage 30 deployed along a midline 54 of vehicle 20. For convenience in description, the at least one wing is depicted as left wing 24, right wing 26, and center section of wing 28. The terms "left", "right", and "center" as used herein are relative to midline 54. Vehicle 20 further includes at least one oscillatory momentum generator 22 (a plurality of generators 22 are pictured, each being denoted by an identifying letter) mounted within the at least one wing (e.g. 24 or 26). A thrust force 32 from the oscillatory momentum generator (e.g. 22t) directed outwards over wing (e.g. 26) causes wing 26 to move in a forward direction (indicated by arrow 24) so that a lift-generating air flow 34 over a surface of the at least one wing 26 is created.

Figure 2:
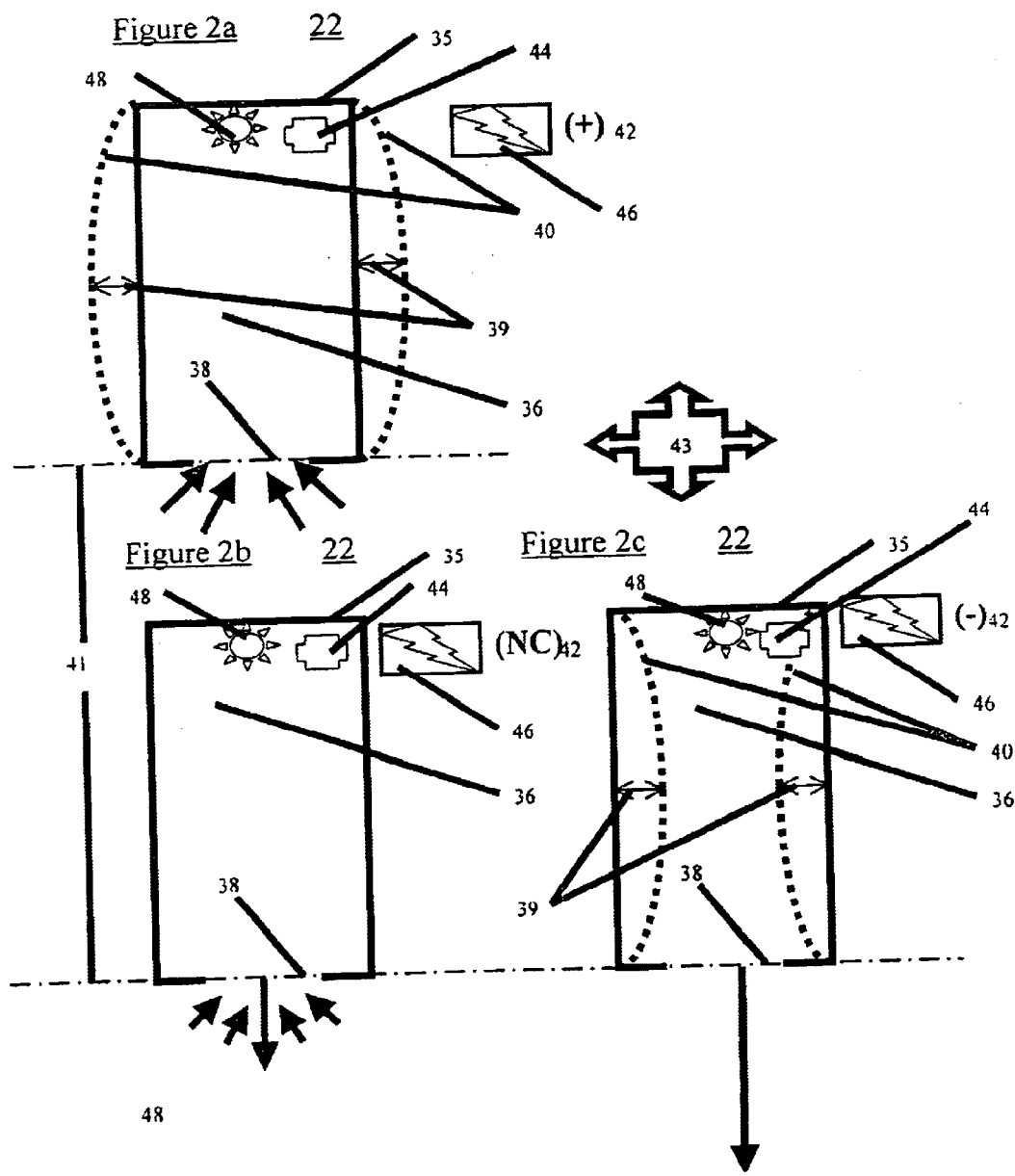
FIGS. 2a–c are cut away views of various operational states of an oscillatory momentum generator according to the present invention.

Preferably, oscillatory momentum generator 22 (FIGS. 2a–c) includes an internal cavity 36 including an oscillatory jet ejection port 38. Port 38 is in fluid communication with an environment 43 exterior to cavity 36. Generator 22 further includes at least one oscillatable diaphragm 40 (two are pictured) designed and constructed to alternately decrease (FIG. 2c) and increase (FIG. 2a) a volume of internal cavity 36. Typically, oscillatory momentum generator 22 is a commercially available device including a metal diaphragm 40 bonded to a piezo electric actuator. One of ordinary skill in the art will be able to select and configure such a commercially available device for use in the context of the present invention. Generator 22 is operated by an alternating electric current 42 applicable to diaphragm 40. Current 42 causes diaphragm 40 to oscillate between an outward position (oscillation distance 39 outwards from external wall 35 of generator 22; FIG. 2a; e.g. if a positive charge is applied) and an inward position (oscillation distance 39 inwards from external wall 35 of generator 22; FIG. 2c; e.g. if a negative charge is applied), thereby alternately causing output of a jet of air (FIG. 2c large downward pointing arrow) and intake of air 31 from environment 43 (FIG. 2a; small arrows converging upon port 38) through port 38. This action creates thrust force 32. FIG. 2 depicts three operational states of generator 22. FIG. 2a shows maximum air intake 31 as described hereinabove. FIG. 2c shows maximum air output to create a strong thrust force 32. Thus, alternation between the operational states depicted in FIGS. 2a and c is preferable. However, a thrust force 32 of lesser magnitude (FIG. 2b) may be created by alternation between the operational states depicted in FIGS. 2a and b or between the operational states depicted in FIGS. 2b and c and a generator 22 operating in this fashion is within the scope of the present invention. In FIG. 2b, diaphragm 40 is not visible because it is obscured by external walls 35. Generator 22 is preferably within wing surface 41. Generator 22 is characterized by zero net mass flux as diaphragm 40 oscillates. This is because thrust force 32 is focused, while air intake 31 is diffuse. Thus, while thrust force 32 moves the vehicle in a first direction, air intake 31 does not cause a reversal of this movement.

Preferably, generator 22 further includes at least one electro-mechanical element 44 designed and constructed to cause diaphragm 40 to vibrate at a frequency proportional to a frequency of alternating electric current 42. Electro-mechanical elements 44 are commercially available and one of ordinarily skill in the art will be able to adapt and employ such an element for use as part of the present invention.

An electric power source capable of supplying alternating electric current 42 is preferably incorporated within vehicle 20. The power source may be, for example, a battery. Thrust force 32 is preferably at least approximately 1 gram per watt of a power emanating from the supplied power source.

Preferably, generator 22 operates at a resonance frequency thereof. Operation at the resonance frequency serves to maximize oscillation distance 39 of diaphragm 40 thereby maximizing thrust force 32. In order to assure operation of generator 22 at its resonance frequency, vehicle 20 may further include an oscillation frequency sensor 48 designed and constructed to sense oscillation of diaphragm 40. Output from sensor 48 may be employed to cause generator 22 to operate at its resonance frequency by means of, for example, a closed loop feedback mechanism.

Figure 3:
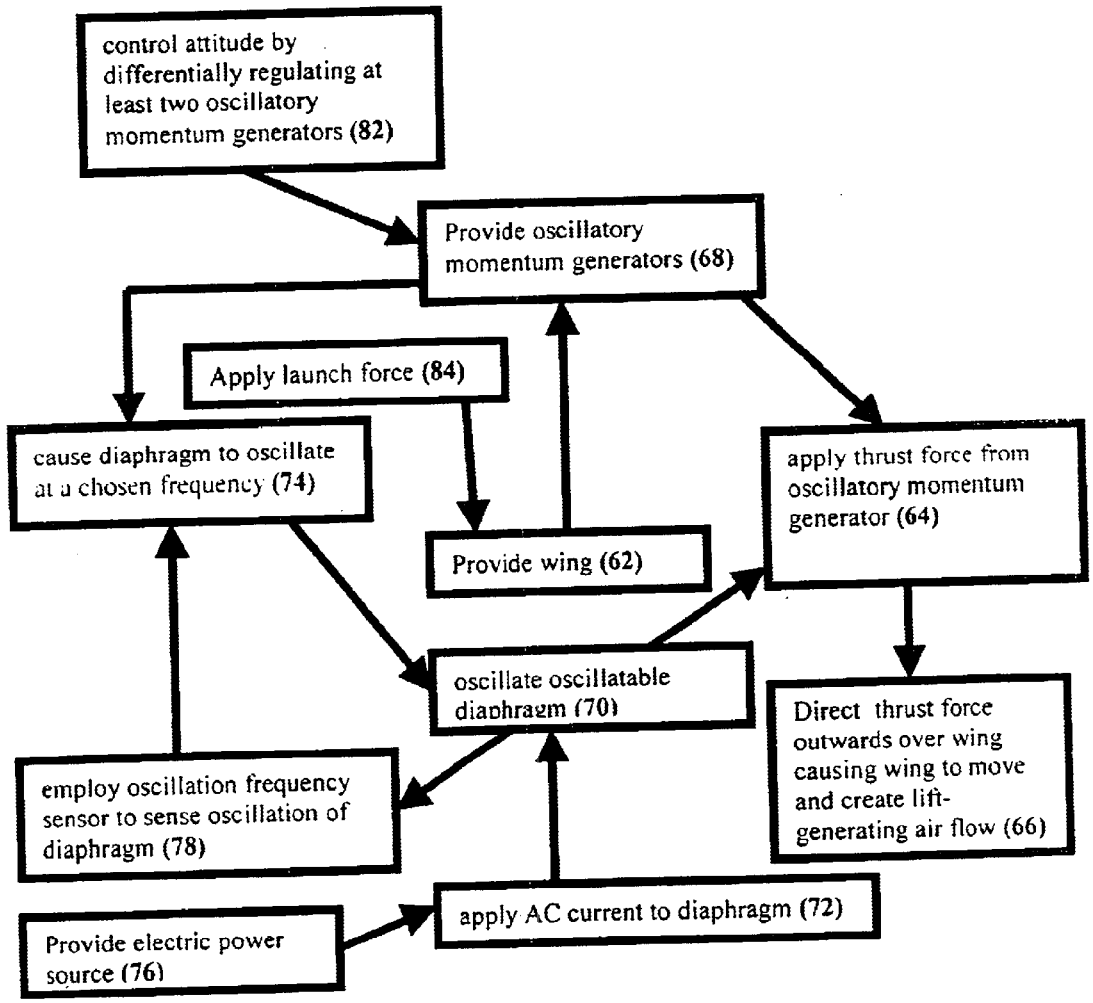
FIG. 3 is a flow diagram showing the sequence of actions in a method according to the present invention.

Flying of vehicle 20 constitutes a method 60 (FIG. 3) which represents an additional embodiment of the present invention, as will be detailed hereinbelow.

Preferably, vehicle 20 further includes an attitude control system 50 which operates by differentially regulating thrust forces 32 applied by at least two of the at least one oscillatory momentum generators 22.

FIG. 4a is a horizontal cross section of vehicle 20 from the back illustrating how clockwise roll may be achieved. A first thrust force 32 having a downward vectorial component is applied by a generator 22 located on a lower surface of left wing 24. A second thrust force 32 having an upward vectorial component is applied by a generator 22 located on an upper surface of right wing 26. The effect of combined thrust forces 32 is a clockwise roll indicated by curved arrow above fuselage 30.

FIG. 4b is a horizontal cross section of vehicle 20 from the side illustrating how pitch control may be achieved. A first thrust force 32 having a downward vectorial component is applied by a generator 22 located on a lower surface of left wing 24. A second thrust force 32 having an upward vectorial component is applied to a generator 22 located on an upper surface of left wing 24. The effect of combined thrust forces 32 is pitch adjustment which raises nose 27 and lowers tail 29 of fuselage 30.

FIG. 4c is a top view of vehicle 20 illustrating how yaw control may be achieved. A first thrust force 32 directed back from left wing 24 is applied. A second thrust force 32 having a greater magnitude is applied directed back from right wing 26. The effect of combined thrust forces 32 is yaw adjustment which moves nose 27 left and tail 29 right.

Thus, attitude control system 50 may regulate parameters including, but not limited to, roll, pitch and yaw. The amenability of generators 22 in conjunction with attitude control systems 50 used in complex control problems is elegantly demonstrated in "Closed-loop Control of a Ball Position on a Beam using Piezo-Electric Fluidic Jets" by M. Nokhimovitch, R. Benima, and H. Aharonov a copy of which is attached as Appendix A and which is fully incorporated herein by reference, Vehicle 20 preferably further includes a launch assist device 33 (FIG. 1) capable of imparting an initial velocity ($v_i$) of approximately at least 10 m/s to vehicle 20. Device 30 may be, for example, a stick, rod or wand equipped with an energy storage mechanism such as, for example, a spring or elastic band (e.g. rubber or latex). According to these embodiments of the invention, vehicle 20 is mounted on device 33. Subsequent release of potential energy stored in, for example, a spring, imparts sufficient kinetic energy to vehicle 20 so that launch is achieved. Alternately, or additionally, device 33 may rely at least partially on the strength of a human arm or leg. In this case, launch may be effected by throwing or kicking vehicle 20. Such embodiments may be preferred if launch is from a significant elevation such as a tower or hilltop. According to these embodiments, acceleration due to gravity may be employed to provide a $v_i$ of approximately at least 10 m/s to vehicle 20. Vehicle 20, after being launched, will typically have an operational speed of 10–20 meters/second.

Preferably vehicle 20 has a wingspan 52 less than or equal to 45 cm.

In order to increase operational efficiency of vehicle 20, the at least one oscillatory momentum generator 22 may include a plurality of oscillatory momentum generators 22 arranged in at least one row along the at least one wing (e.g. generators 22 a–c on left wing 24, or generators 22 r–t or generators 22 n, p and q on right wing 26 as depicted in FIG. 1).

One preferred configuration of rows is depicted on left wing 24 which includes 7 generators 22. Generators 22a–c form a first row, generators 22d and e form a second row and generators 22f and g form a third row.

A second preferred configuration of rows is depicted on right wing 26 which includes 9 generators 22. Generators 22 h, j and k form a first row, generators 22 n, p and q form a second row and generators 22 r, s and t form a third row.

According to still further features in the described preferred embodiments the thrust force exits the oscillatory momentum generator at an angle of less than approximately 45 degrees with respect to the surface of the wing. Preferably, thrust force 32 is directed to a trailing edge 58 of the wing. Alternately, or additionally, a thrust force may be directed towards a leading edge 56 of a wing, for example as a means of controlling pitch or yaw.

It will be appreciated that because vehicle 20 may be constructed with no external moving parts it offers significant advantages with respect to prior art alternatives. For example, the absence of external moving parts reduces drag, reduces noise, reduces wear on jets, reduces fragility and increases robustness.

The present invention is further embodied by a method 60 (FIG. 3) of flying a vehicle 20. The method includes providing 60 on vehicle 20 at least one wing having at least one oscillatory momentum generator 22 mounted 68 therein and applying 64 thrust force 32 from generator 22. The thrust force is directed 66 outwards over the wing causing the wing to move so that a lift generating air flow over a surface of the at least one wing is created.

Preferably, applying 64 thrust force 32 includes providing 68 the oscillatory momentum generator 22, oscillating 70 the diaphragm 40 to alternately decrease and increase a volume of internal cavity 36, applying 72 alternating electric current 42 to diaphragm 40 to cause 70 it to oscillate, thereby expelling an air stream through jet emanation port 38 and creating thrust force 32. Generator 22 is as described hereinabove.

Preferably, applying 64 thrust force 32 further includes employing at least one electro-mechanical element 44 designed and constructed to cause 74 diaphragm 40 to vibrate at a frequency proportional to a frequency of the alternating electric current. Preferably the frequency is a chosen frequency, most preferably a resonance frequency of generator 22, or wing 24 or vehicle 20.

Preferably, method 60 further includes providing 76 an electric power source capable of supplying the alternating electric current 42. Method 60 preferably further includes employing 78 an oscillation frequency sensor to sense oscillation of diaphragm 40. An output of the oscillation frequency sensor is then employed to cause 74 the oscillatory momentum generator to operate at chosen frequency, preferably a resonance frequency thereof.

Method 60 may further include controlling 82 an attitude of the vehicle by differentially regulating thrust force 32 applied by at least two oscillatory momentum generators 22.

Successful practice of method 60 may further require applying 84 a launch force capable of imparting an initial velocity ($v_i$) of approximately at least 10 m/s to the vehicle. This application 84 of launch force may be accomplished, for example, as described hereinabove.

Figure 5:
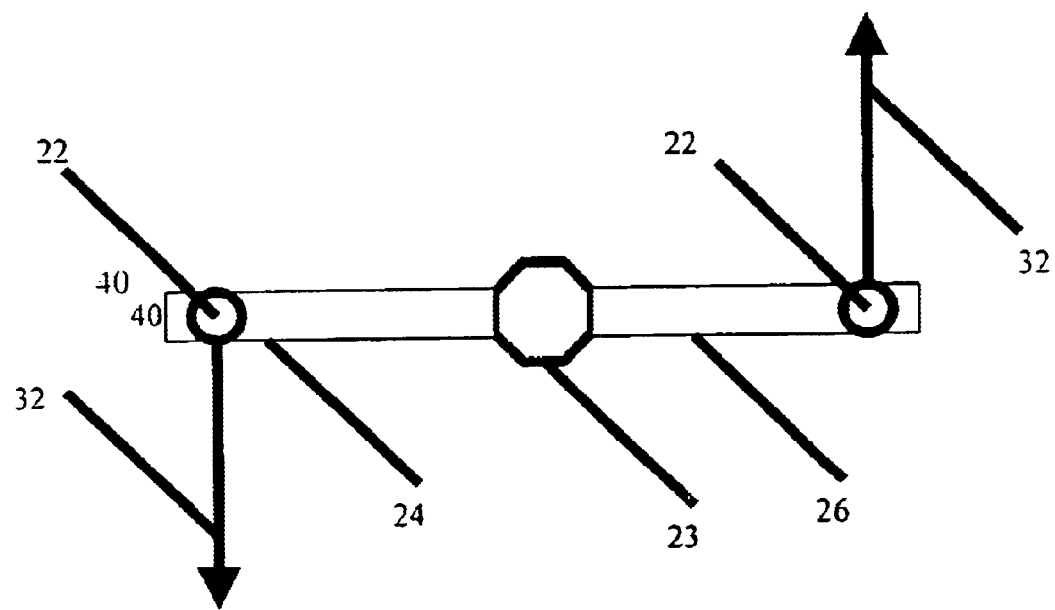
FIG. 5 is a top view of a rotary wing rotate-able about an axis via oscillatory momentum generators according to the present invention.

FIG. 5 illustrates that oscillatory momentum generators 22 of the present invention may further be employed to cause wings (e.g. 24 and 26) to rotate about an axis of rotation 23 by application of thrust forces 32.

The present invention successfully addresses the shortcomings of the presently known configurations by providing an aerial vehicle controlled and propelled by oscillatory momentum generators and method of flying same. Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

EXAMPLES

Reference is now made to the following examples, which together with the above descriptions, illustrate the invention in a non limiting fashion.

Example 1

Effects of Weight and Aspect Ratio

Figure 6A:
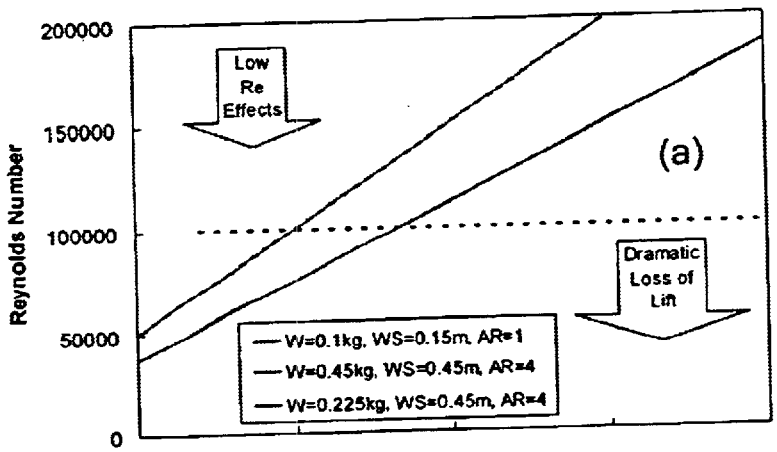
FIGS. 6a–c are graphs illustrating the influence of weight and aspect ratio (AR) on performance characteristics of flying vehicles.
Figure 6B:
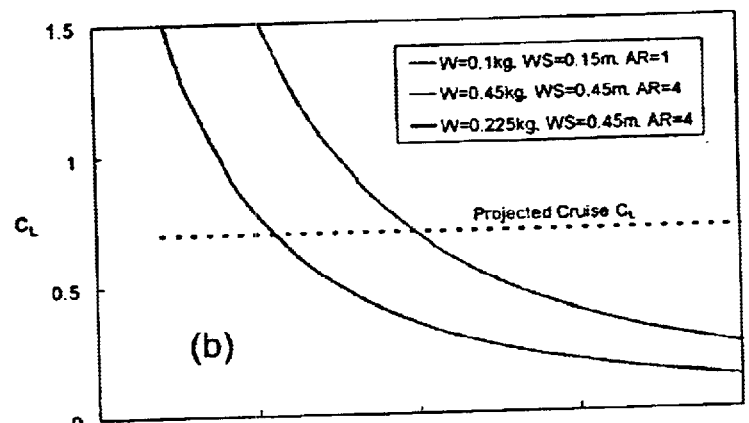
Figure 6C:
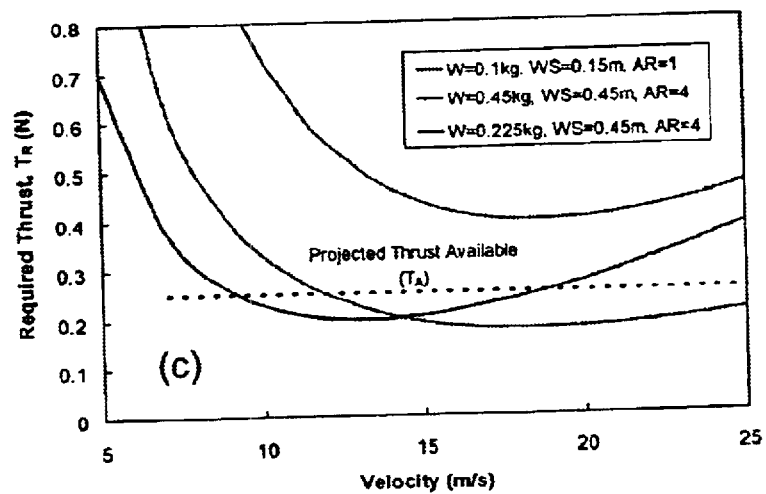

In order to illustrate basic aerodynamic advantages of a mUAV according to the present invention, consider estimates of Reynolds number, $C_L$ and thrust required ($T_R$) as functions of flight speed (V), presented in FIGS. 6a–c respectively.

For purposes of comparison, the figures show calculations for three different configurations;

1) a conventional prior art mAV (weight W=0.1 kg, wing-span WS=0.15 m and aspect ratio AR=1; specifications approximately correspond to Lockheed Martin's MicroSTAR)
2) a light mUAV according to the present invention (i.e. WS=0.45 m, AR=4; W=0.225 kg)
3) a heavy mUAV according to the present invention (i.e. WS=0.45 m, AR=4; W=0.45 kg)

For all configurations, typical flight speeds are assumed to be approximately between 5 m/s and 25 m/s (see e.g. Spedding. and Maxworthy (1986) J. Fluid Mech., Vol. 165, pp. 247–272). FIG. 6a shows that the larger mUAVs are subjected to lower Reynolds numbers, for the flight speeds considered, as a result of the higher, more conventional, aspect ratio. It is well known that aerodynamic performance is severely degraded at approximately Re<100,000 and this is one of the main reasons why current mAVs employ such inefficient aspect ratios (AR≈1). Consequently, for a mUAV according to the present invention to successfully fly, some means must be employed to overcome the low Re problems. AFC provides a solution to this problem as will be detailed hereinbelow FIG. 6b illustrates that, for the range of flight speeds under consideration, the conventional heavy mUAV and the light mUAV require the same $C_L$ for flight. These values (i.e. $C_L \leq 0.7$) are generally attainable for flight speeds $\geq$10 m/s. It is important to note that the heavier mUAV needs to fly faster (V$\geq$15 m/s) for flight to be viable, i.e. required $C_L \leq 0.7$.

A key factor in assessing aircraft performance, is the thrust required ($T_R$) for steady level flight. Here, $T_R$ has been calculated according to the method outlined by Anderson (Anderson, J. D. Jr., "Introduction to Flight", McGraw-Hill, New York, 3ed, 1989). The main assumptions are presented here, while details of the calculation are given in Example 2 herein below. It is assumed that the zero-lift parasite drag is the same for the mAV and both mUAVs (i.e. $C_{D0}$=0.02, see Anderson (Ibid); and FIG. 21 of Seifert, A. and Pack, L. G, 2000, "Separation Control at Flight Reynolds numbers: Lessons learned and Future directions", AIAA paper 2000-2542, AIAA Fluid 2000 meeting, Denver, Colo., Jun. 19–22, 2000). Secondly, the Oswald efficiency for all vehicles is assumed to be uniform and typical of conventional aircraft.

Curves representing thrust required for steady level flight (FIG. 6C) show that, even though the wingspan is increased by a factor of 3, the minimum $T_R$ for both the mAV and the light mUAV are comparable. For the mUAV, this is due to the cancellation effect of the larger aspect ratio and the factor 2.25 increase in weight. Further comparing the mAV with the light mUAV shows that the two vehicles have different optimum speed ranges. For example, if 0.25N of thrust is available ($T_A$) from the propulsor/s, then the flight speed ranges are $8 \leq V_{mini} \leq 18$ versus $12 \leq V_{micro} \leq 27$ for the heavy mUAV and light mUAV, respectively. As expected, doubling the weight to 0.45 kg results in a doubling of the minimum thrust required for flight.

Example 2

Theoretical Considerations in Predicting Flight Characteristics

The following equations present the method used for generating the curves in FIG. 6c (Adapted from Anderson (Ibid)) as well as all assumptions invoked.

A force balance shows that for level steady flight:

$$\frac{T}{W} = \frac{C_D}{C_L}$$

where T and W are thrust and weight respectively. Therefore, the thrust required ($T_R$) by the AFC devices employed in the present invention, for example, to overcome the total aircraft drag is $$T_R = \frac{W}{C_L/C_D} \quad (A.1)$$

Thus, for a given velocity, the lift coefficient is calculated from $$C_L = \frac{W}{1/2\rho_\infty V_\infty^2 S} \quad (A.2)$$

Therefore it is possible to calculate the total drag of the aircraft, i.e.

$$C_D = C_{D0} + \frac{C_L^2}{\pi e AR} \quad (A.3)$$

where $C_{D0}$ is the zero-lift parasite drag (typically 0.02 to 0.025 for conventional aircraft), e is the Oswald efficiency factor (usually $\approx$0.8 for conventional aircraft) and AR is the aspect ratio. It should be noted that $C_{D0}$ for the mUAVs according to the present invention are lower since the aircraft is free of wing-body junctions, engine nacelles, cockpit, etc. In fact, the most conservative turbulent flat-plate correlation (Schultz-Grunow) gives $C_{D0}$=0.0091, while for laminar flow $C_{D0}$=0.0051, both at Re=50,000. However, in order to provide conservative estimates, $C_{D0}$=0.02 has been employed for the calculations used to generate FIG. 6c.

Thus for a given weight (W), equations (A.2) and (A.3) are employed in (A.1) to calculate $T_R$. Repeating the procedure for a number of different velocities results in the graph of presented in FIG. 6c. In general $T_R$ is quoted in dimensional units because power plants are usually rated in terms of thrust or horse-power (where the equivalent quantity would be power required $P_R = T_R V_\infty$).

Example 3

Previous Active Flow Control Limitations

Previously, it has been generally accepted that airfoil performance is significantly degraded below Re~O(10$^5$). Further successive degradation occurs at Re=84,000 and 42,000, where many airfoils fail to generate useful lift.

Figure 7A:
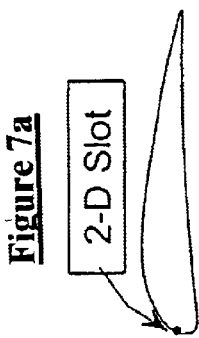
FIGS. 7a–c are a cut away view of an airfoil (panel a) with an interior plenum in fluid communication with a nominally two-dimensional, leading-edge slot, panels b and c are plots of $C_L$ as a function of $\alpha$.
Figure 7C:
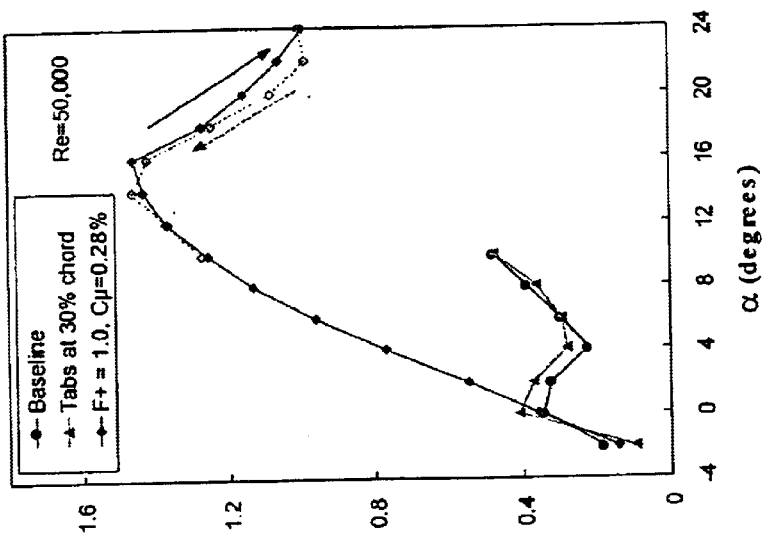

Using an airfoil, originally designed as a flap (FIG. II.4a Now FIG. 7a), with chord length c=109 mm and maximum thickness (t/c)$_{max}$=17% (see Greenblatt, D. and Wygnanski, I., "Use of Periodic Excitation to Enhance Airfoil Performance at Low Reynolds Numbers" AIAA Journal of Aircraft, Vol. 38, No. 2, 2001, pp. 190–192.). The pictured airfoil has an interior plenum in fluid communication with a nominally two-dimensional, leading-edge slot (h=0.5 mm at x/c=2%) and is equipped with 18 surface pressure taps located on the center-span. Static and dynamic pressure measurements were made for $30,000 \leq Re \leq 150,000$ at baseline and controlled conditions. Zero net mass-flux excitation (alternating air intake and output via the same port) was achieved by means of an externally-mounted rotating valve and a small centrifugal blower connected to the airfoil plenum. Slot calibration, i.e. the measurements of velocity fluctuations at the slot exit ($U_{rms}$), was performed by means of a hot-wire anemometer. For a given excitation frequency, span-averaged and centerline peak velocity fluctuations did not differ by more than 5%. In addition to excitation, boundary layer tripping was attempted by means of 6 mm diameter×1 mm high circular tabs, spaced at 20 mm intervals along the span at several chord locations.

Figure 7B:
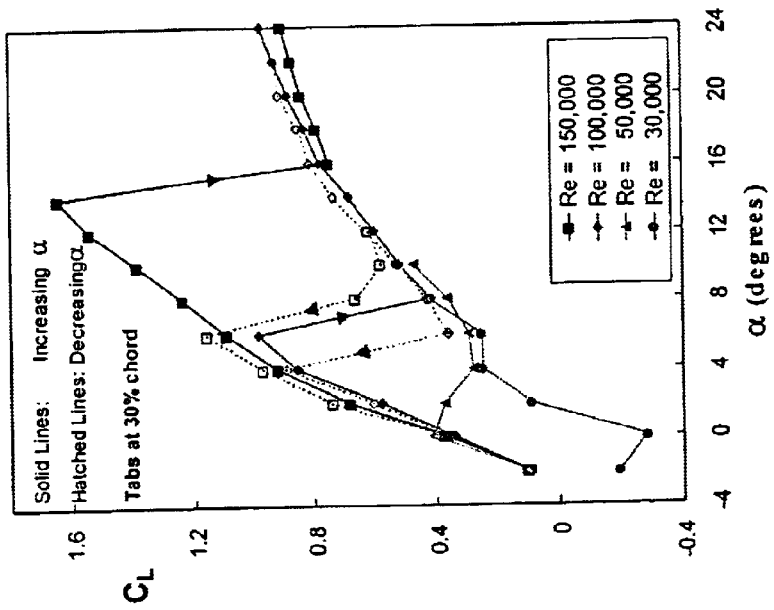

FIG. 7b shows $C_L$ versus α data for 30,000≦Re≦150,000, where tabs are located at the 30% chord position (most effective for boundary layer tripping). The data are representative of performance degradation as the Reynolds number approaches, and decreases into, the mUAV regime.

For Re=150,000, the airfoil performs relatively well, achieving $C_{L,max}$=1.64, but stalls sharply at α=14°. With decreasing α, there is exceptionally large lift hysteresis with full reattachment at α=6° This renders the airfoil unsuitable for operation around $α_{stall}$.

Reducing the Reynolds number to Re=100,000 brings about significant performance degradation, i.e. a 40% reduction in $C_{L,max}$ with stall at α=6°. An additional reduction to Re=50,000 results in a further severe performance degradation and is typical of conditions prevailing at these Reynolds numbers. For the lowest Reynolds number tested here, namely Re=30,000, the airfoil fails to generate useful lift.

The effect of tabs and active separation control on the baseline (clean) airfoil is shown for Re=50,000 in FIG. II.5. Attempts to trip the flow using tabs at various locations resulted in little to no improvement over the baseline data, although a detailed study of various tab shapes and sizes was not performed here. The best case (i.e. tabs at x/c=30%) effects a modest improvement in $C_{L,max}$. Excitation, on the other hand, results in a four-fold increase in $C_{L,max}$ for two reduced frequencies, namely F$^+$=1.0, while the momentum coefficient ($Cμ$) is typical of those effective for $10^5$≦Re≦$10^6$.

1. As was shown above, in addition to severe performance degradation, lift hysteresis can be excessive at low Re (see FIG. II.4). Hysteresis was checked for the F$^+$=1.0 case and the data shows that the phenomenon is all but eliminated by excitation—a feature repeatedly observed when active control is applied at the leading-edge of a dynamically pitching airfoil for Re≧100,000 (see Greenblatt and Wygnanski (1999) AIAA Papers 99-3121 and 99-3504, 17th AIAA Applied Aerodynamics Conference, Norfolk, Va., June 28–July 1).

Accompanying poor lifting performance for Re≦$10^5$, airfoil efficiency (i.e. lift to drag ratio: $C_L/C_D$) is degraded. In this preliminary investigation, total drag was not measured, but form drag ($C_{Dp}$) was reduced from the airfoil surface pressure data. The results for $C_L/C_{Dp}$ [baseline and tabbed cases], and $C_L/(C_{Dp}+Cμ)$ [controlled cases] showed that, even with $C_μ$ accounted for, excitation increases baseline airfoil maximum efficiency by one order of magnitude from 7.4 to 77, and the higher value of efficiency occurs at about twice the baseline value of $C_L$. Further experiments revealed that AFC was still effective at Re=30,000, by transforming a non-lifting airfoil into one which approaches conventional performance.

Example 4

Active Flow Control Employing Cavity-Mounted Piezo-Based Actuators

Zero mass-flux cavity-mounted piezo electric actuators provide a solution to the problems associated with low Reynold's numbers as described in Example 3. These improved actuators produce oscillatory flow at a slot where their operation range is between 0.4 kHz to 1.0 kHz. Preliminary data show that the actuators are capable of producing RMS velocities of up to 30 m/s. The basic principle is that the actuator produces a jet during the output phase, while the intake phase is more a potential-flow governed phenomenon. The net effect is that each actuator is capable of producing up to 2 grams of thrust, with a power consumption of approximately 1 Watt per gram of thrust.

Figure 8A:
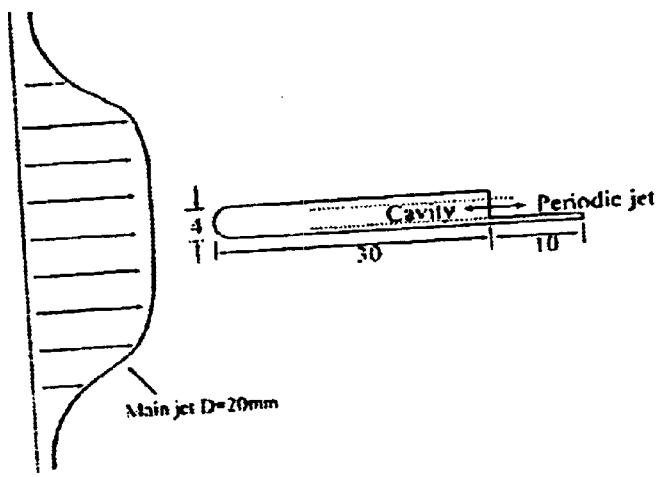
FIGS. 8a–d are a side view of an actuator according to the present invention (panel a) and graphs of force and power as a function of applied voltage (panel b), mean and RMS velocity as a function of Z position (panel c) and velocity profiles (panel d) illustrating the effect of the actuator.

A series of experiments were conducted employing these improved actuators in order to evaluate the effectiveness of thrust generation due to high amplitude periodic excitation and to assess the effect of the external stream on thrust generation. A simple actuator prototype was built (see FIG. 8a for cross-sectional view) with a total thickness of 4 mm, a rounded leading-edge and a slot (2 mm high and 20 mm wide). A 10 mm long flat plate extended from the slot lower surface in order to simulate periodic excitation on the surface of an airfoil.

Figure 8B:
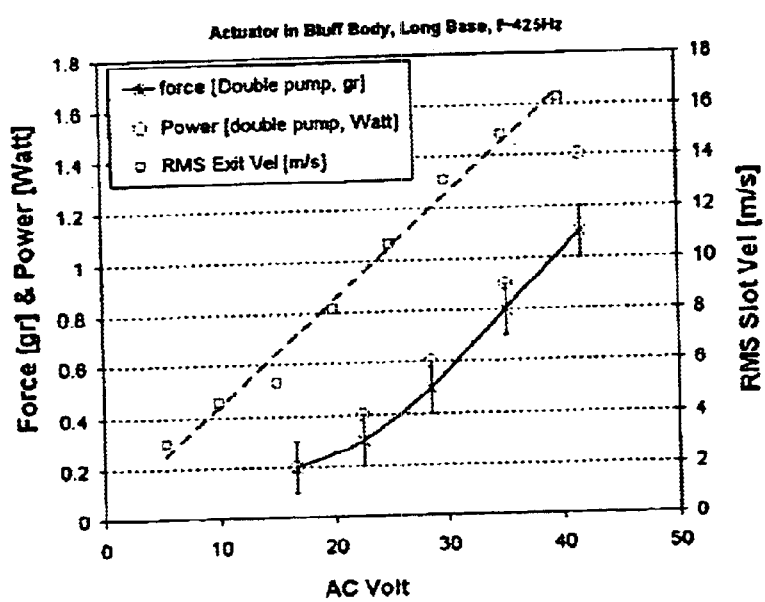
Figure 8C:
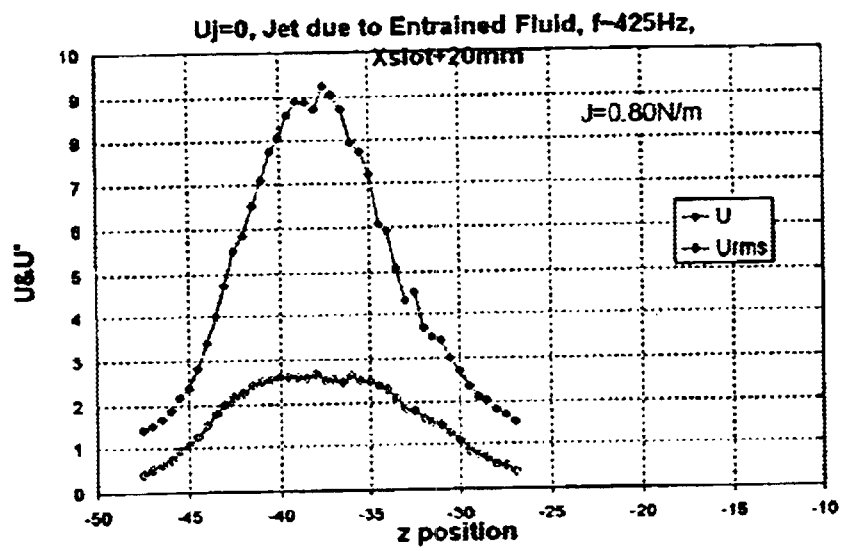

Performance of the actuator was evaluated in two ways. First, The magnitude of the velocity fluctuations was measured at the exit of the slot, with no external flow. Second, the thrust produced by the actuator was measured by placing the actuator on an accurate balance with the slot facing upwards. FIG. 8b presents the slot exit velocity (20 mm from the slot exit), the force generated and the power consumed by the actuator when operating at approximately 425 Hz. A typical RMS of the velocity fluctuation is 16 m/s, consuming 1 Watt of power to generate 1 gram of force (FIG. 8b).

Figure 8D:
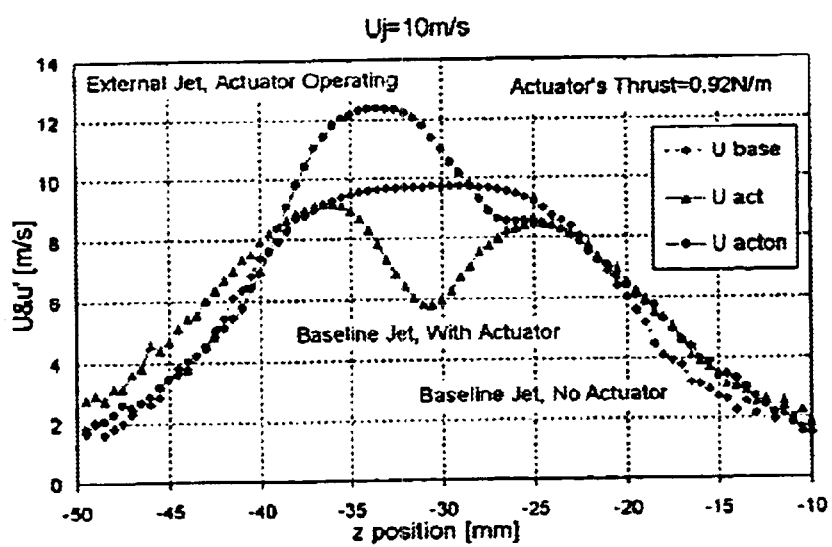

As shown in FIG. 8D, the periodic excitation entrains stagnant flow and a "synthetic jet" is generated. The jet momentum, assuming 2D flow, was estimated at approximately 0.8 N/m, resulting in 1.6 grams for the 20 mm slot span, which is of the same order as the direct force measurement, in spite of neglecting the reduction in the magnitude of the periodic excitation off centerline.

The improved actuator was then placed in a relatively large jet flow, with the slot facing downstream (FIG. 8a), in order to evaluate the effect of an external stream on the thrust generated by the periodic excitation. Without the actuator operating the bluff body reduces the jet momentum, and generates a wake, as in FIG. 8d. When the external stream is 10 m/s, with the actuator operating, the jet momentum increased by 0.9 N/m, and is comparable to the thrust measured when the external jet was not flowing. It was thus clearly demonstrated that the total jet momentum increased due to the periodic excitation. Similar momentum additions were measured at larger jet speeds of 15 and 20 m/s.

Example 5

Integration of Propulsion and Lift

Figure 9A:
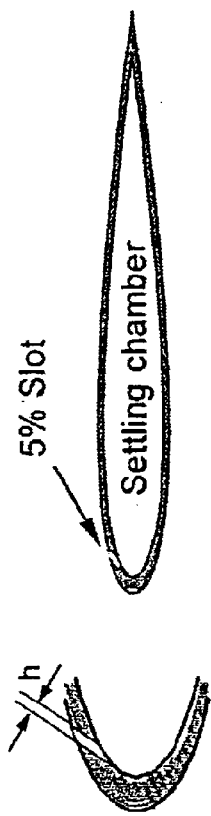
FIGS. 9a–e are a side cut away view of an actuator according to the present invention mounted in a leading edge of an airfoil (panel a) and graphs of $C_L$ as a function of $\alpha$ (panel b), $C_L$ as a function of $C_d$ (panel c) $C_P$ as a function of x/c (panel d) and the influence of high amplitude excitation on wake momentum (panel e).

Zero mass-flux jets (as described in Example 4) which simultaneously control separation and generate thrust were next employed to study the feasibility of high-amplitude excitation (or forcing) for combined propulsion and lift of a 2'×8" (610 mm×203 mm) aluminum NACA 0012 airfoil equipped with 50 surface pressure taps and a two-dimensional slot at 5% chord (see FIG. 9a), orientated at 45° to the chord-line. It is important to note that the slope of the airfoil surface in that region makes the slot to surface angle much smaller than 45 degrees. Sections of the airfoil's internal ribbing were removed to render an essentially hollow interior which served as a plenum chamber. Forcing was achieved by means of the externally-mounted rotating valve and a small centrifugal blower described above.

Figure 9C:
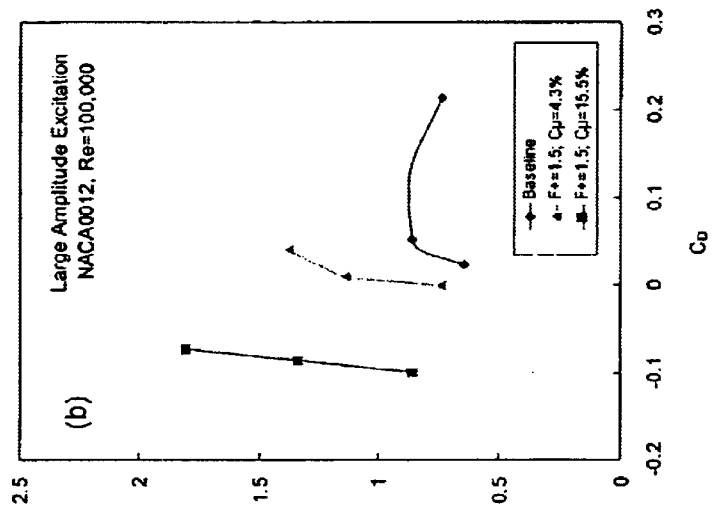
Figure 9B:
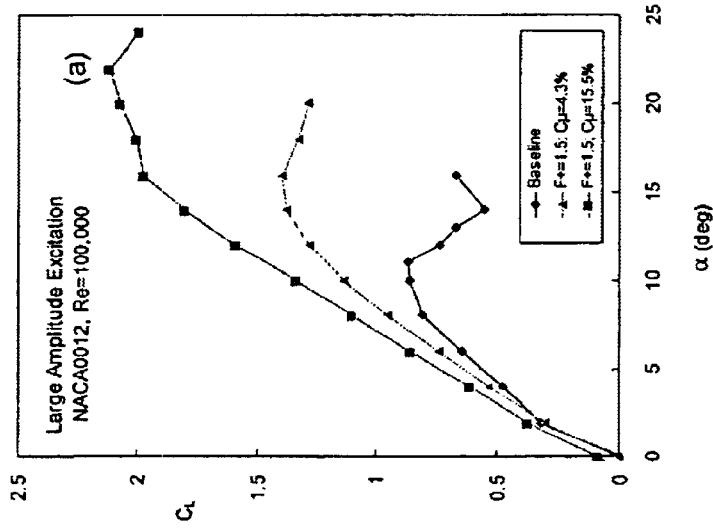

Data for $C_L$ versus $\alpha$ and $C_D$ are presented in FIGS. 9b and c respectively, showing baseline data together with data high-amplitude forcing with zero net mass-flux. The combination of low Reynolds number and symmetric airfoil results in a low baseline $C_{L,max}$ of 0.86. Forcing at $C_\mu$=4.3%, however, increases $C_{L,max}$ by nearly 40% to 1.4, while higher amplitude forcing at $C_\mu$=15.5% results in a further increase in $C_{L,max}$ to 2.1 (FIG. 9b).

Figure 9D:
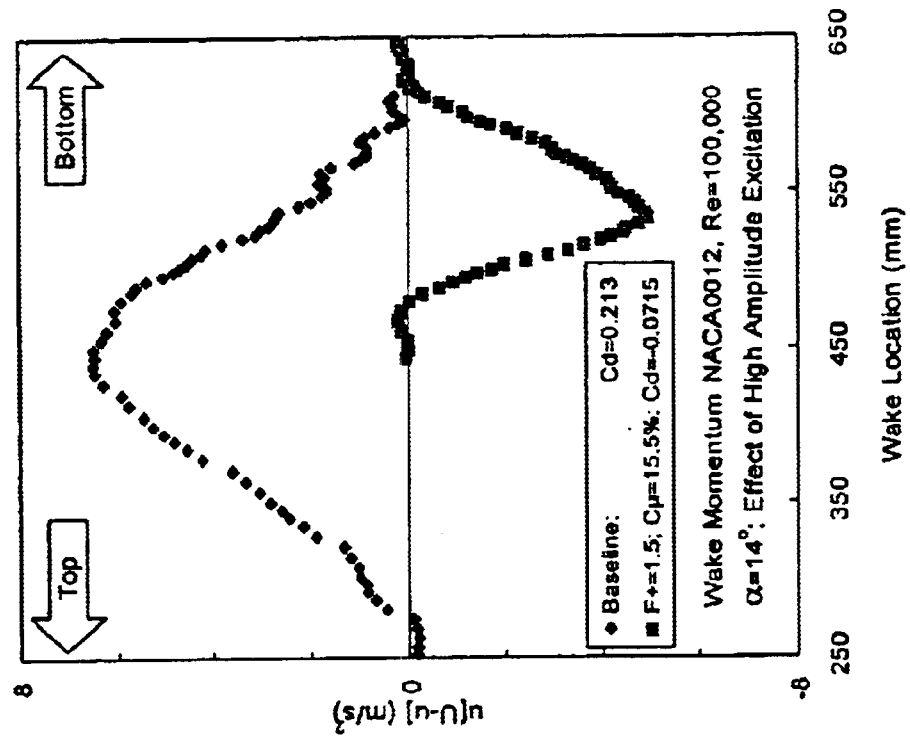
Figure 9E:
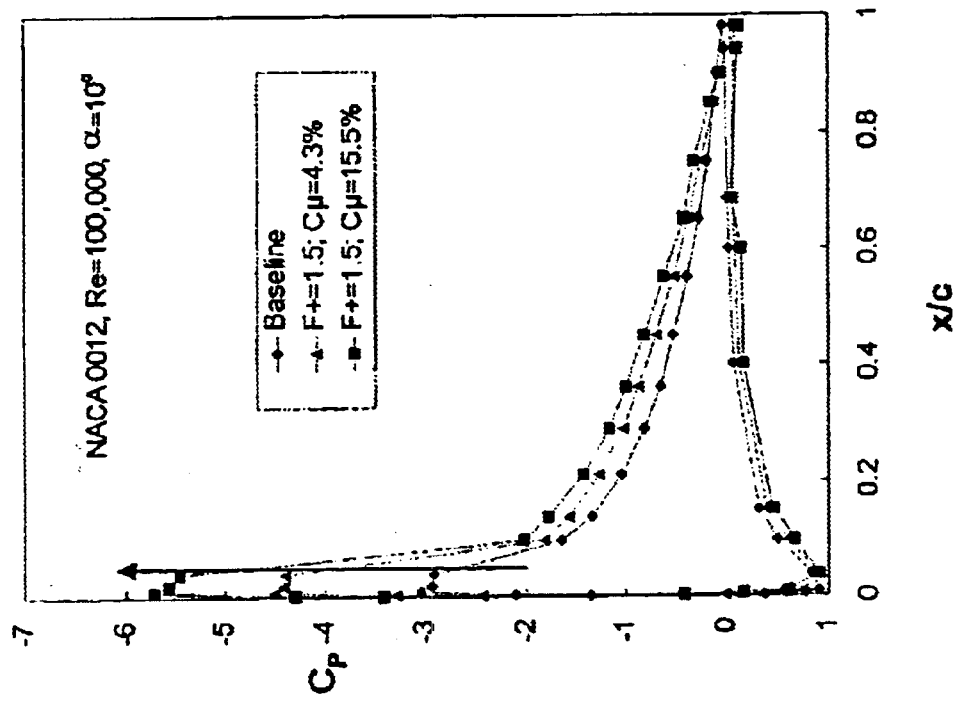

Airfoil surface pressure distributions, for $\alpha$=10° (FIG. 9d) show that the lift is generated by significant suction upstream of the forcing slot. FIG. 9c shows that, apart from generating high $C_L$ AFC can either eliminate drag ($C_\mu$=4.3%) or produce thrust ($C_\mu$=15.5%), where the drag reduction or thrust is of the same order as the RMS addition <J> for this airfoil. With $C_\mu$=15.5%, wake surveys indicated that a momentum surplus (or jet) is present somewhat below the location of where a wake existed previously (see FIG. 9e).

While the disclosed method resembles known methods of steady air output via introduction of a high momentum jet from the surface of the wing, it is superior in terms of effectiveness and efficiency as well as practical implementation.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed:

1. A vehicle capable of flight, the vehicle comprising:
   (a) at least one wing; and
   (b) at least one oscillatory momentum generator mounted within said at least one wing so that a thrust force from said oscillatory momentum generator is directed outwards over said wing causing said wing to move so that a lift-generating air flow over a surface of said at least one wing is created; and
   wherein said thrust force exits said oscillatory momentum generator at an angle of less than 45 degrees with respect to said surface of said wing and wherein said thrust force is directed to a trailing edge of said wing.

2. The vehicle of claim 1, wherein said oscillatory momentum generator comprises:
   (i) an internal cavity including an oscillatory jet ejection port, said jet ejection port being in communication with an environment exterior to said cavity;
   (ii) at least one oscillatable diaphragm designed and constructed to alternately decrease and increase a volume of said internal cavity; and
   (iii) an alternating electric current applicable to said at least one oscillatable diaphragm, said alternating electric current causing said diaphragm to oscillate, thereby expelling air through said jet emanation port and creating said thrust force.

3. The vehicle of claim 2, wherein said oscillatory momentum generator further comprises:

(iv) at least one electro-mechanical element designed and constructed to cause said diaphragm to vibrate at a frequency proportional to a frequency of said alternating electric current.

4. The vehicle of claim 2, further comprising an electric power source capable of supplying said alternating electric current.

5. The vehicle of claim 4, wherein said thrust force is at least approximately 1 gram per watt of a power emanating from said power source.

6. The vehicle of claim 1, wherein said oscillatory momentum generator operates at a resonance frequency thereof.

7. The vehicle of claim 2, further comprising an oscillation frequency sensor designed and constructed to sense oscillation of said diaphragm, an output thereof employable to cause the device to operate at its resonance frequency.

8. The vehicle of claim 1, further comprising an attitude control system which operates by differentially regulating a thrust force applied by at least two of said at least one oscillatory momentum generators.

9. The vehicle of claim 8, wherein said attitude control system regulates at least one parameter selected from the group consisting of roll, pitch and yaw.

10. The vehicle of claim 1, further comprising a launch assist device capable of imparting an initial velocity ($v_i$) of approximately at least 10 m/s to the vehicle.

11. The vehicle of claim 1, wherein a wingspan thereof does not exceed 45 cm.

12. The vehicle of claim 1, wherein said at least one oscillatory momentum generator includes a plurality of oscillatory momentum generators arranged in at least one row along said at least one wing.

13. A method of flying a vehicle, the method comprising:
   (a) providing on the vehicle at least one wing, said wing having at least one oscillatory momentum generator mounted therein; and
   (b) applying a thrust force from said at least one oscillatory momentum generator, said thrust force being directed outwards over said wing causing said wing to move so that a lift-generating air flow over a surface of said at least one wing is created; and
   (c) directing said thrust force to exit said oscillatory momentum generator at an angle of less than 45 degrees with respect to said surface of said wing and directed to a trailing edge of said wing.

14. The method of claim 13, wherein said applying said thrust force comprises:
   (i) providing said oscillatory momentum generator, said generator including an internal cavity, an oscillatory jet ejection port in fluid communication with an environment exterior to said cavity and with said cavity, at least one oscillatable diaphragm, and an alternating electric current;
   (ii) oscillating said at least one oscillatable diaphragm to alternately decrease and increase a volume of said internal cavity; and
   (iii) applying said alternating electric current to said at least one oscillatable diaphragm to cause said diaphragm to oscillate, thereby expelling an air stream through said jet emanation port and creating said thrust force.

15. The method of claim 14, wherein said applying said thrust force further comprises:
   (iv) employing at least one electro-mechanical element designed and constructed to cause said diaphragm to vibrate at a frequency proportional to a frequency of said alternating electric current.

16. The method of claim 14, further comprising providing an electric power source capable of supplying said alternating electric current.

17. The method of claim 16, wherein a thrust force of at least approximately 1 gram per watt of electric power emanating from said power source is achieved.

18. The method of claim 13, further comprising causing said oscillatory momentum generator to operate at a resonance frequency thereof.

19. The method of claim 18, further comprising employing an oscillation frequency sensor to sense oscillation of said diaphragm, and further employing an output of said oscillation frequency sensor to cause said oscillatory momentum generator to operate at a resonance frequency thereof.

20. The method of claim 13, further comprising controlling an attitude of the vehicle by differentially regulating a thrust force applied by at least two of a plurality of said at least one oscillatory momentum generators.

21. The method of claim 20, wherein said controlling an attitude includes regulation of at least one parameter selected from the group consisting of roll, pitch and yaw.

22. The method of claim 13, further comprising applying a launch force capable of imparting an initial velocity ($v_i$) of approximately at least 10 m/s to the vehicle.

23. The method of claim 13, further comprising limiting a wingspan of said at least one wing to less than approximately exactly 45 cm.

24. The method of claim 13, further comprising deploying a plurality of said at least one oscillatory momentum generators in at least one row along said at least one wing.

* * * * *